United States Patent [19]  
Inoue

[11] Patent Number: 4,485,286  
[45] Date of Patent: Nov. 27, 1984

[54] MULTI-VIBRATOR HEAD EDM METHOD AND APPARATUS

[75] Inventor: Kiyoshi Inoue, Tokyo, Japan

[73] Assignee: Inoue-Japax Research Incorporated, Yokohama, Japan

[21] Appl. No.: 367,734

[22] Filed: Apr. 12, 1982

[51] Int. Cl.³ .............................................. B23P 1/12
[52] U.S. Cl. ................................ 219/69 M; 204/222; 219/69 V
[58] Field of Search ............... 219/69 V, 69 M, 69 W, 219/69 R, 68; 204/129.7, 222, 223; 310/26, 323, 325; 51/59 SS

[56] References Cited

U.S. PATENT DOCUMENTS

| | | | |
|---|---|---|---|
| 2,806,328 | 9/1957 | Bradfield | 51/59 SS |
| 2,834,158 | 5/1958 | Petermann | 51/59 SS |
| 3,039,333 | 6/1962 | Jones et al. | 310/26 |
| 3,134,011 | 5/1964 | Bruyn | 219/69 V |
| 3,166,840 | 1/1965 | Bancroft et al. | 310/26 |
| 3,184,841 | 5/1965 | Jones et al. | 310/26 |
| 3,271,283 | 9/1966 | Clifford et al. | 219/69 V |
| 3,275,788 | 9/1966 | Ferguson | 219/69 V |
| 3,396,285 | 8/1968 | Minchenko | 310/325 |
| 3,610,865 | 10/1971 | Osenbruggen | 219/69 V |
| 4,097,710 | 6/1978 | Maillet | 219/69 V |
| 4,107,504 | 8/1978 | Dinsdale | 219/69 M |
| 4,125,444 | 11/1978 | Inoue | 204/129.7 |
| 4,205,213 | 5/1980 | Inoue | 219/69 M |
| 4,277,915 | 7/1981 | Hausermann et al. | 219/69 V |
| 4,358,655 | 11/1982 | Inoue | 219/69 W |
| 4,365,133 | 12/1982 | Inoue | 219/69 V |
| 4,379,960 | 4/1983 | Inoue | 219/69 M |

FOREIGN PATENT DOCUMENTS

| | | | |
|---|---|---|---|
| 0004751 | 10/1979 | European Pat. Off. | 219/69 V |
| 0005195 | 11/1979 | European Pat. Off. | 219/69 V |
| 1091255 | 10/1960 | Fed. Rep. of Germany | 219/69 V |
| 2413000 | 9/1975 | Fed. Rep. of Germany | 51/59 SS |
| 45-40405 | 12/1970 | Japan | 219/69 V |
| 635537 | 11/1978 | U.S.S.R. | 310/323 |

Primary Examiner—C. L. Albritton  
Assistant Examiner—Geoffrey S. Evans  
Attorney, Agent, or Firm—Karl F. Ross; Herbert Dubno

[57] ABSTRACT

The machining efficiency is markedly increased in EDM by having a plurality of vibration horn assemblies in engagement with a tool assembly at preselected different positions on the surface thereof. The electromechanical transducers in the horn assemblies are individually energized to provide a burst of mechanical vibrations from the vibration output face of the horn member in each vibrator assembly in contact with the tool assembly and to allow the burst to be transmitted to the machining surface of the machining electrode to vibrationally activate a selected area thereof. The plurality of the vibrational bursts produced at the different locations on the tool assembly are combined, by being applied sequentially or at a time, to allow the machining surface of the electrode to be vibrationally activated uniformly over the entire area thereof. The arrangement is advantageously applicable to a variety of electrodes which may be large and to machining a deep and narrow, and/or intricate cavity in the workpiece.

34 Claims, 7 Drawing Figures

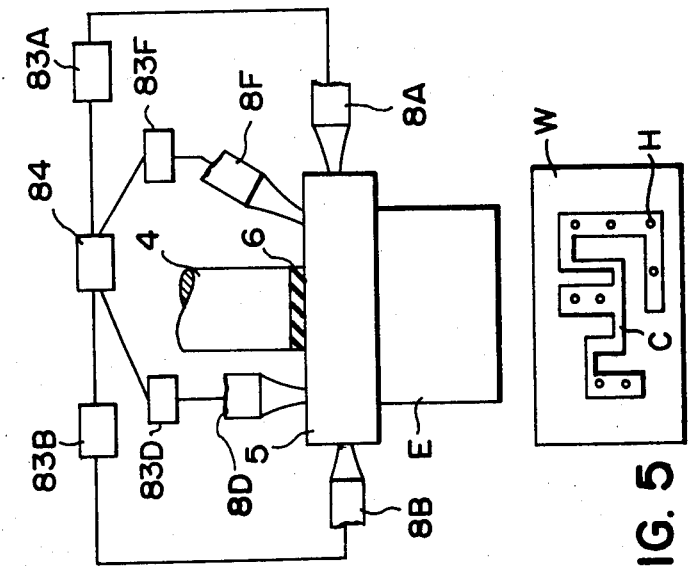
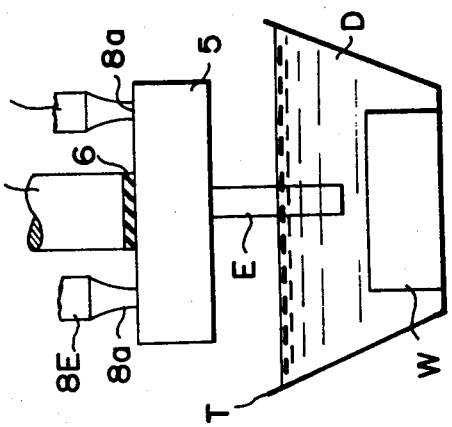

MULTI-VIBRATOR HEAD EDM METHOD AND APPARATUS

CROSS REFERENCE TO RELATED APPLICATIONS

This application discloses subject matter in part disclosed in Ser. No. 226,417 (U.S. Pat. No. 4,379,960 issued Apr. 12, 1983) filed Jan. 19, 1981 as a continuation in part of Ser. No. 150,355 (U.S. Pat. No. 4,366,358); Ser. No. 190,757 filed Sept. 25, 1980 (U.S. Pat. No. 4,365,133 issued Dec. 21, 1982); and Ser. No. 121,662 filed Feb. 15, 1980 as a continuation in part of Ser. No. 60,346.

FIELD OF THE INVENTION

The present invention relates to an electrical discharge machining (EDM) method and apparatus in general. In particular, it is concerned with an EDM method and apparatus in which at least one machining electrode securely supported by an electrode support member is positioned in a machining relationship with a conductive workpiece in the presence of a liquid dielectric and a succession of electrical discharges, are effected between the at least one electrode and the workpiece to electroerosively remove stock from the workpiece while the electrode or electrodes and the workpiece are relatively displaced to advance the stock removal, thereby progressively generating a cavity in the workpiece with a machining surface of the at least one electrode. The invention specifically relates to an EDM method and apparatus of the class described utilizing an electrode vibrational activation system.

BACKGROUND OF THE INVENTION

Where a cavity to be machined in the workpiece is deep and narrow and/or of intricate shape, difficulty in enhancing the machining efficiency has always been the problem in the EDM art. Attempts have been made to resolve this problem by imparting ultrasonic vibrations to the machining electrode during the EDM machining operation. The prior technique has employed a single vibration horn assembly which has an electromechanical transducer energizable with a high-frequency oscillatory electrical signal to cause mechanical oscillations therein, and an amplifier horn member attached to the transducer to provide the mechanical oscillations of an amplified strength from its vibration output face which is reduced in cross-sectional area. Heretofore, such an ultrasonic horn assembly has commonly been attached vertically to the machine spindle or electrode support to locate the vibration output face of the horn downwards to which the machining electrode is in turn attached so as to depend therefrom, the machining electrode having the electrode machining surface positionable in spaced juxtaposition with the workpiece. The horn member or assembly is thus arranged as an integral part of the total assembly and coaxial with the spindle and the electrode. This arrangement has proved to be successful to increase the EDM machining efficiency to a measurable extent but has imposed restrictions on the material, shape and weight of the machining electrode to be carried by the horn assembly since the body of the electrode need to resonate with the vibrating horn carriage. If there is deviation from resonance or mechanical impedance is mismatched, the vibrational input to output efficiency is sharply reduced to such an extent as to render the assembly impractical. Furthermore, undesirable excessive heat develops which may damage the machining electrode. Difficulty in gaining and maintaining the resonant conditions also arises due to the fact that the machining electrode unavoidably is worn during the machining operation. The input frequency to the transducer may be varied in steps but this measure not only renders the arrangement complex and costly but tends to give rise to serious changes in the machining conditions.

From the practical point of view, it should also be noted that needs exist in the industry for achieving a higher goal as far as the EDM efficiency is concerned. Greater machining efficiency is obtainable if machining stability, which is particularly difficult to gain in deep and/or intricate cavity forming, is improved. It has now been observed that with the conventional arrangement, the vibrational activation tends to be restricted on a limited area of the machining surface of the electrode and other areas thereof are left uncontrolled, providing sites for stagnation of the contaminated machining liquid, gases and other machining products and hence contributing to machining instability.

OBJECTS OF THE INVENTION

It is, accordingly, an important object of the present invention to provide an improved EDM method and apparatus whereby the machining efficiency is markedly increased.

Another object of the invention is to provide an EDM method and apparatus utilizing a mechanical vibration system applicable to a variety of machining electrodes (e.g. large, heavy, intricate or of high length-to-width ratio) and consecutively effective throughout a given EDM operation as well as in a variety of machining operations.

SUMMARY OF THE INVENTION

In accordance with the present invention, in a first aspect thereof, there is provided an EDM method wherein at least one machining electrode securely supported by an electrode support member, which is in turn carried by a spindle, is positioned in a machining relationship with a workpiece in the presence of a liquid dielectric and a succession of electrical discharges are effected between the electrode and the workpiece to electroerosively remove stock from the workpiece while the electrode and the workpiece are relatively displaced to advance the stock removal, thereby progressively generating a cavity in the workpiece with a machining surface of the electrode and wherein the electrode, the support member and an end portion of the spindle proximal to the support member constitute a tool assembly, which method comprises: (a) disposing a plurality of vibrator horn assemblies each individually comprising an electromechanical transducer and a horn member attached thereto in such a manner that the respective vibration output faces of the horn members are disposed in engagement with a portion of the said tool assembly at preselected different positions on the surface thereof; and (b) individually energizing the electromechanical transducers in the respective horn assemblies to impart mechanical vibrations to the said portion at the said preselected positions thereon and to cause the mechanical vibrations to be transmitted through the electrode, thereby vibrationally activating the machining surface uniformly over the entire area thereof.

The invention also provides, in a second aspect thereof, an EDM apparatus having a tool assembly including at least one machining electrode positionable in a machining relationship with a workpiece in a liquid dielectric, an electrode support member carried by a spindle for securely supporting the machining electrode and an end portion of the spindle proximal to the support member; means for effecting a succession of electrical discharges between the at least one machining electrode and the workpiece to electroerovisly remove stock from the workpiece and machining feed means drivingly coupled with one of the tool assembly and/or the workpiece for relatively displacing them to advance the stock removal whereby a cavity is progressively generated in the workpiece with a machining surface of the machining electrode, which apparatus comprises: a plurality of vibrator horn assemblies each individually having an electromechanical transducer and a horn member attached thereto, and individually disposable in engagement with a portion of the tool assembly in such a manner that the respective vibration output faces of the horn members are disposed in engagement with the said portion at preselected different positions on the surface thereof; and power supply means for individually energizing the electromechanical transducers in the respective horn assemblies to impart mechanical vibrations to the said portion at the preselected positions thereon and to cause the mechanical vibrations to be transmitted through the electrode, thereby vibrationally activating the machining surface uniformly over the entire area thereof.

BRIEF DESCRIPTION OF THE DRAWING

These and other features of the present invention as well as advantages thereof will become more readily apparent from reading of the following description of certain preferred embodiments thereof, taken with reference to the accompanying drawing in which:

FIG. 3 is a side elevation illustrating an arrangement of the invention utilizing a plurality of vibration horn assemblies arranged vertically in parallel with one another and in engagement with the electrode support plate;

FIG. 4 is a side elevation illustrating a further arrangement according to the invention utilizing a plurality of vibration horn assemblies oriented in different manners and in engagement with the tool assembly;

FIG. 5 is a plan illustrating a workpiece with an intricate cavity being EDMed.

SPECIFIC DESCRIPTION

Figure 1:
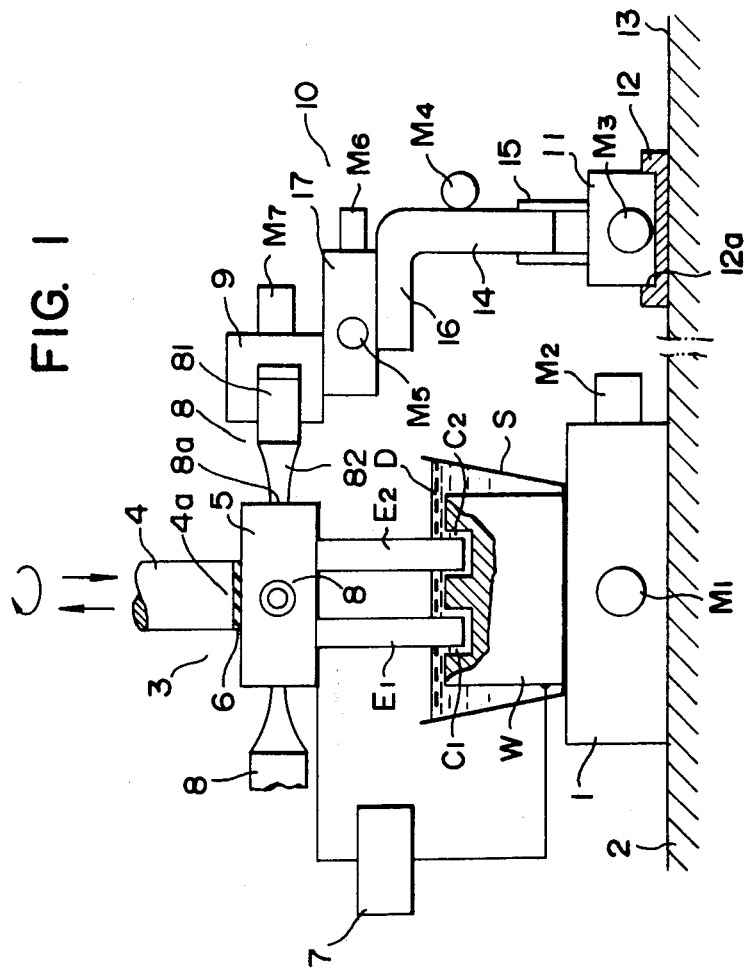
FIG. 1 is a front elevation diagrammatically illustrating an apparatus according to the invention utilizing a plurality of vibration horn assemblies arranged horizontally in a plane and in engagement with the electrode support member.

Referring to FIG. 1, an electrically conductive workpiece W is shown securely mounted in a work tank T filled with a dielectric machining liquid D. The work tank T is securely held on a worktable 1 which is movable horizontally by means of a pair of motors M1 and M2 on a machine bed 2. The motor M1 is arranged to move the workpiece W in the direction of an X-axis and the motor M2 is arranged to move the workpiece W in the direction of a Y-axis which is orthogonal to the X-axis. The workpiece W is immersed in the dielectric machining liquid D.

A tool assembly 3 comprises a lower end portion 4a of a spindle 4, an electrode holder or supporting plate 5 detachably secured thereto and a pair of machining electrodes E1 and E2 detachably secured to the supporting plate 5. The electrodes E1 and E2 are here each in the form of a cylindrical rod and secured to the supporting plate 5 at diametrically opposite positions symmetrical about the axis thereof. The supporting plate 5 is here in the form of an electrically conductive disk of a substantial thickness and secured to the lower end portion 4a of the cylindrical spindle 4 coaxially therewith. An electrical insulating plate 6 is inserted between the latter and the supporting plate 5.

An EDM power supply 7 is electrically connected to the conductive supporting plate 5 and the workpiece W to apply a succession of EDM pulses across dielectric filled machining gaps formed between the electrodes E1, E2 and the single workpiece W juxtaposed therewith. A succession of electrical discharges are thereby produced between the individual electrodes E1, E2 and the workpiece W to remove stock from the latter. As stock removal continues, the spindle 4 is vertically advanced by a servo drive unit (not shown) to axially advance the electrodes E1, E2 into the workpiece W so that cavities C1 and C2 are progressively generated therein as shown. The servo drive unit may operate to periodically or aperiodically move the spindle 4 upwards so as to temporarily retract the electrodes E1, E2 to remove a short-circuiting condition which may arise in the machining gaps and/or to intermittently pump the dielectric machining liquid in the regions of electrodes E1, E2 and the workpiece W into and away from the machining gaps. Optionally the spindle 4 may be rotated by a rotary drive unit (not shown) to revolve the electrodes E1, E2 about the axis of the supporting plate 5 and the spindle 4 when an annular cavity is to be machined in the workpiece W.

Figure 2A:
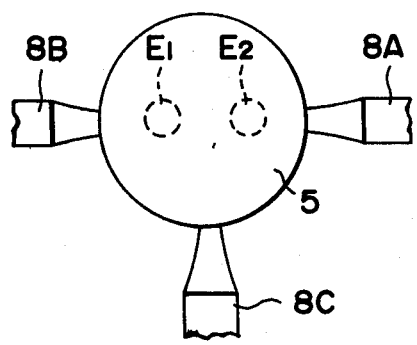
FIG. 2(a) is a plan illustrating three vibration horn assemblies arranged horizontally in engagement with the tool assembly.

A plurality of ultrasonic vibrator horn assemblies 8 which may be three in number as shown at 8A, 8B and 8C in FIG. 2(a) are disposed, in accordance with the invention, surrounding the electrode supporting plate 5 in a horizontal plane. Each assembly 8 may be of conventional design and comprises an electromechanical transducer 81 electrically energizable to produce high-frequency mechanical vibrations therein and an amplifier horn 82 having the end of greater cross-sectional area attached to the transducer 81. The transducer 81 is energized with an electrical oscillation signal, e.g. a high-frequency AC, furnished by a power supply, preferably associated with a control circuit (not shown here, see FIG. 4). The horn 82 has its output end 8a of a reduced cross-sectional area held in contact with the side wall of the electrode supporting plate 5. Each vibrator horn assembly 8 is horizontally supported by a holder 9 which forms a portion of a carriage 10 therefor.

Each carriage 10 includes a base block 11 movably retained in an annular rail 12a of a rail block 12 which is mounted on a base 13 so as to surround the worktable 1. The base block 11 is provided with a motor M3 and movable thereby along the rail 12a in the annular rail block 12. A vertical block 14 is slidably received in a cylinder 15 securely mounted on the base block 11 and is movable vertically by a motor M4. A horizontal plate 16 forming the upper portion of the vertical block 14 carries a table 17 on which the vibrator holder 9 is movably carried. The table 17 is horizontally movable by means of a pair of motors M5 and M6 along a pair of mutually orthogonal axes on the surface of the plate 16. The holder 9 is provided with a motor M7 and turnable thereby about a vertical axis on the table 17.

Individual carriages 10 are moved on the common rail block 12 along the rail 12a by respective motors M3 to be brought to predetermined positions around the downward extension of the axis of the spindle. In each carriage 10, the motor 4 is driven to vertically position the vibrator horn assemblies 8. The motors M5 and M6 are driven to bring the output end 8a of each assembly 8 in contact with the wall of the electrode supporting plate 5 at a preselected position thereon. To this end, the motor M7 may also be driven.

Figure 2B:
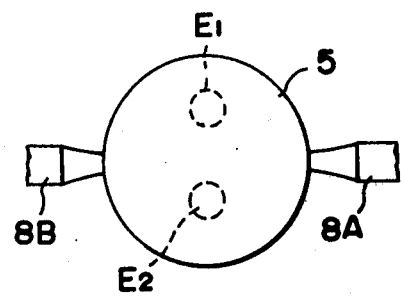
FIG. 2(b) is a similar plan illustrating two vibration horn assemblies oriented towards each other across the electrode support plate.

FIG. 2(a) shows three horn assemblies 8A, 8B and 8C engaged with the electrode supporting plate 5. The assemblies 8A and 8B are positioned diametrically opposite and oriented coaxially towards each other in a direction intersected by the parallel axes of the electrodes E1, E2 and the assembly 8C is positioned and oriented orthogonally to that direction. FIG. 2(b) shows two horn assemblies 8A and 8B engaged with the electrode supporting plate 5 at diametrically opposite positions thereacross and oriented coaxially towards each other in a direction orthogonal to the direction intersected by the parallel axes of the electrodes E1, E2. In these arrangements, one or more of the assemblies 8 may be operated at a time. Thus, two or more assemblies 8 may be operated at a time, alternately or sequentially. In this manner, respective bursts of mechanical vibrations are imparted to the supporting plate 5 at different wall areas and propagated therethrough and through the electrodes E1, E2 to vibrationally activated preselected different machining surface areas thereon predominantly and hence the electrode machining surface uniformly over the entire area thereof. The arrangement of the invention is particularly advantageous when a deep and/or intricate cavity is to be machined in the workpiece with a correspondingly shaped electrode. With the arrangements of the invention, distinct modes of mechanical vibrations of the electrode—which are defined as a function of the locations at which the input vibrations are applied—are thus provided to vibrationally activate the different areas of the machining surface of the electrode correspondingly. The result is a uniform vibrational activation of the entire machining area.

FIG. 3 shows a pair of vibrator horn assemblies 8D and 8E engaged with a supporting plate 5 carrying a single electrode E for machining a workpiece W. The assemblies 8D and 8E are each oriented vertically and have their individual vibration output end faces 8a of their horns secured by bolting (not shown) to the upper horizontal surface of the electrode supporting plate 5 at diametrically opposite positions symmetrical about the axis thereof which is common with the axes of the spindle 4 and the electrode E. The assemblies 8D and 8E may be operated simultaneously or alternately. It has also been found to be advantageous to operate them intermittently at different frequencies such that there repetitively occurs a period in which both of them operate.

FIG. 4 shows a further arrangement of the invention in which assemblies 8A and 8B are oriented and engaged horizontally with the side wall of the supporting plate 5 at preselected different positions thereon symmetrical or not symmetrical about the common axis of the spindle 4, the supporting plate 5 and a large formed electrode E. Another assembly 8D is oriented and engaged vertically with the upper surface of the supporting plate 5 at a preselected position thereon and a further assembly 8F is oriented and engaged obliquely with the upper surface of the supporting plate 5 at another preselected position thereon. The positions at which the assemblies 8A, 8B, 8D and 8E are engaged with the supporting plate 5 are determined depending on the particular configuration and the depth of a cavity to be formed in the workpiece and local dimensions (i.e. widths and depths) of the cavity. Shown in FIG. 5 is the workpiece W formed with the cavity C of intricate contour machined with the electrode E having a correspondingly formed contour. A plurality of holes H are preformed in the workpiece W to facilitate flushing of the machining gap with the dielectric machining liquid. Such holes may alternatively be formed in the electrode E.

In the arrangement of FIG. 4, it is essential that each vibrator horn assembly 8A, 8B, 8D and 8F have its individual vibration output end face 8a brought into contact and held in contact with the electrode support plate 5 by being carried on a positioning carriage as shown in FIG. 1 or secured to the electrode plate 5 by bolting or any other fixing means such as an adhesive. Further, in this embodiment as well, the assemblies 8A, 8B, 8D and 8F may be operated simultaneously, successively or cyclically, or in any other desirable mode. It has been found to be particularly effective to energize each or at least one of the electromechanical transducers 81 in the respective assemblies intermittently so that a succession of time-spaced bursts of mechanical vibrations of an adjusted intensity are provided from the vibration output face 8a of the horn member 82 and transmitted at least predominantly to a preselected area of the machining surface of the electrode. Preferably, the different transducers 81 should be energized and deenergized sequentially, although there may be a time in which mechanical vibrations developed at the different input areas overlap, so that the different areas of the machining surface of the electrode are sequentially vibrationally activated. To this end, power supplies 83A, 83B, 83D and 83F for energizing the respective transducers 81A, 81B, 81D and 81F in the assemblies 8A, 8B, 8D and 8F are shown controlled as to their timing of energization by a control circuit 84. The control circuit 84 may also be adapted to adjust the intensities of the individual vibration outputs of the assemblies 8A-8F, to simultaneously, successively or cyclically, or selectively modify the output intensities of the assemblies 8A-8F.

Figure 6:
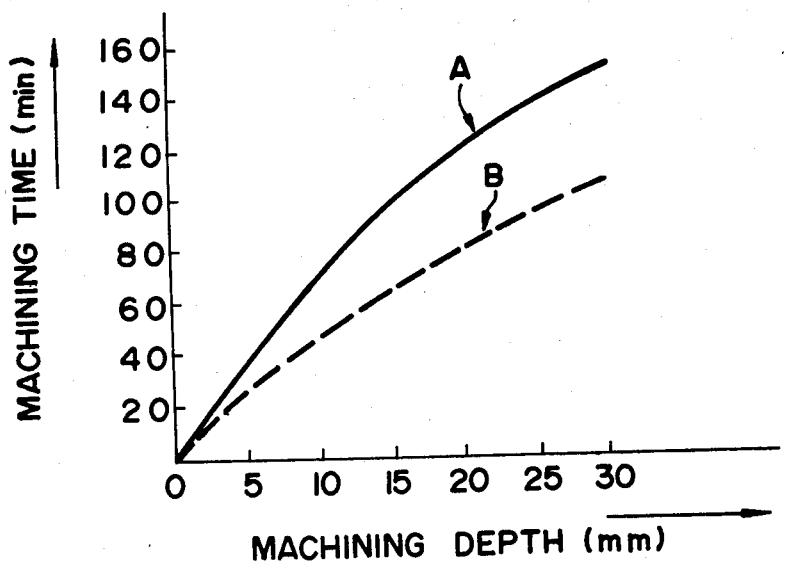
FIG. 6 is a graph illustrating results of experimentation and demonstrating a increase in machining efficiency with an embodiment of the invention over the prior art.

FIG. 6 shows a graph in which the machining depth in mm is plotted along the abscissa and the machining time in minutes is plotted along the ordinate. Two curves A and B in the graph represent results of experimentation conducted in EDMing a steel workpiece W to form a cavity (square) of a width of 0.3 mm and a depth of 30 mm therein with a correspondingly shaped copper electrode E. Electrical discharges have a peak current Ip of 8 amperes, a voltage pulse duration $\tau on$ of 38 microseconds and a voltage pulse interval τoff of 60 microseconds. The dielectric machining liquid is kerosene. When no vibration assembly is used, machining takes 414 minutes to reach the depth of 30 mm. (a) When a single vibration head assembly is used having an output of 10 watts, a vibration amplitude of 5 to 20 micrometers and a vibration frequency of 32 kHz, the machining time is reduced to 153 minutes. The vibrator head assembly is continuously operated during the machining. The relationship between the machining depth and the machining time is represented by the curve A. (b) When two such assemblies are employed and arranged as shown in FIGS. 1 and 2(b), the machining time is surprisingly further reduced to 106 minutes which represents an increase of 30% in machining efficiency over the use of the single vibrator head assembly. One of the two vibrator head assemblies is operated periodically with an on-time of 2 seconds followed by an off-time of 2 seconds and the other is operated periodically with an on-time of 1 second and an off-time of 2 seconds during the machining. The relationship between the machining depth and the machining time is represented by the curve B in the graph.

In another experimentation, a steel workpiece is EDMed to form a cavity (square) of a width of 0.8 mm and a depth of 35 mm, using a correspondingly shaped copper electrode. Electrical discharges have a peak current of 8 amperes and a voltage pulse duration of 1.5 microsecond. The dielectric machining liquid is here again kerosene. (a) When no vibrator horn assembly is used, machining takes 314 minutes. (b) When a single vibrator head assembly with an output frequency of 28.6 kHz and an output power of 20 watts is used and arranged so as to attach its output end face (8a) horizontally to the side wall of the support plate 5, machining takes 74 minutes. (c) When two vibrator horn assemblies each having an output frequency of 28.6 kHz and an output power of 10 watts are used and arranged as shown in FIG. 2(b), machining takes only 22 minutes. (d) When two vibrator horn assemblies each having an output frequency of 31.2 kHz and an output power of 25 watts are used and arranged as shown in FIG. 3, machining takes only 24 minutes.

From the foregoing, it will be appreciated that a striking increase in machining efficiency is obtained with a plurality of vibrator horn assemblies attached to an electrode tool assembly in a manner as shown and described. It should be noted that the term "tool assembly" referred to herein is used to include an support plate 5, securely supporting at least one electrode E, a lower end portion 4a of the spindle 4 and the electrode or electrodes E; E1, E2.

What is claimed is:

1. An EDM method wherein at least one machining electrode securely supported by an electrode support member, which is in turn carried by a spindle, is positioned in a machining relationship with a workpiece in the presence of a liquid dielectric and a succession of electrical discharges are effected between the electrode and the workpiece to electroerosively remove stock from the workpiece while the electrode and the workpiece are relatively displaced to advance the stock removal, thereby progressively generating a cavity in the workpiece with a machining surface of the electrode and wherein the said at least one electrode, the support member and an end portion of the spindle proximal to the support member constitute a tool assembly, the method comprising the steps of:

(a) disposing a plurality of vibrator horn assemblies, each of which individually comprises an electromechanical transducer and a horn member attached thereto, in such a manner that the respective vibration output faces of said horn members are disposed in engagement with a portion of said tool assembly at preselected different positions on the surface thereof; and (b) individually energizing said electromechanical transducers in the respective horn assemblies to impart mechanical vibrations to said portion at said preselected positions thereon and to cause said vibrations to be directly transmitted through the body of said at least one electrode, thereby vibrationally activating said machining surface uniformly over the entire area thereof.

2. The method defined in claim 1 wherein at least one of said horn assemblies is disposed so as to lie in a plane substantially orthogonal to a longitudinal axis of said tool assembly.

3. The method defined in claim 2 wherein at least two horn assemblies lie commonly in such a plane.

4. The method defined in claim 3 wherein the two horn assemblies in said plane are oriented towards each other across said longitudinal axis.

5. The method defined in claim 2, claim 3 or claim 4 wherein at least one of said horn assemblies is disposed so as to be oriented in a direction substantially orthogonal to said plane.

6. The method defined in claim 5 wherein at least two such horn assemblies are disposed and arranged substantially parallel with one another.

7. The method defined in claim 5 wherein at least one of said horn assemblies is disposed so as to be oriented obliquely with an angle to said plane.

8. The method defined in claim 1 wherein at least one of said horn assemblies is disposed so as to be oriented substantially orthogonally to a plane orthogonal to a longitudinal axis of said tool assembly.

9. The method defined in claim 8 wherein at least two such horn assemblies are disposed and arranged substantially in parallel with one another.

10. The method defined in claim 9 wherein at least one of said horn assemblies is disposed so as to be oriented obliquely with an angle to said plane.

11. The method defined in claim 1 wherein said portion of the tool assembly is said electrode support member.

12. The method defined in claim 11 wherein said electrode support member is in the form of a circular disk coaxial with said spindle.

13. The method defined in claim 11 or claim 12 wherein more than one machining electrodes are securely supported by said electrode support member and spacedly arranged thereon to extend substantially in parallel with one another.

14. The method defined in claim 1 wherein at least one of said electromechanical transducers is energized intermittently to provide from the vibration output face of said horn member, a succession of time-spaced bursts of mechanical vibrations of an adjusted intensity and to permit said succession of time-spaced bursts to be transmitted through said at least one electrode to the machining surface thereof.

15. The method defined in claim 14 wherein each of said electromechanical transducers is so energized.

16. The method defined in claim 14 wherein said electromechanical transducers are energized sequentially.

17. The method defined in claim 15 or claim 16 wherein each of said electromechanical transducers are periodically energized and deenergized with preset times of energization and deenergization.

18. In an EDM apparatus having a tool assembly including at least one machining electrode positionable in a machining relationship with a workpiece in the presence of a liquid dielectric therebetween, an electrode support member carried by a spindle for securely supporting the machining electrode and an end portion of the spindle proximal to the electrode support member; means for effecting a succession of electrical discharges between the machining electrode and the workpiece to electroerosively remove stock from the workpiece and machining feed means drivingly coupled with at least one of the tool assembly and the workpiece for relatively displacing them to advance the stock removal whereby a cavity is progressively generated in the workpiece with a machining surface of the at least one machining electrode, the improvement which comprises:

a plurality of vibrator horn assemblies, each of which individually has an electromechanical transducer and a horn member attached thereto and which are individually disposable in engagement with a portion of said tool assembly in such a manner that the respective vibration output faces of the horn members are disposed in engagement with said portion at preselected different positions on the surface thereof; and power supply means for individually energizing said electromechanical transducers in the respective horn assemblies to impart mechanical vibrations to said portion at said preselected positions thereon and to cause said mechanical vibration to be directly transmitted through the body of said at least one electrode, thereby vibrationally activating said machining surface uniformly over the entire area thereof.

19. The improvement defined in claim 18 wherein at least one of said horn assemblies is disposed so as to lie in a plane substantially orthogonal to a longitudinal axis of said tool assembly.

20. The improvement defined in claim 19 wherein at least two horn assemblies are disposed to lie commonly in such a plane.

21. The improvement defined in claim 20 wherein the two horn assemblies in said plane are disposed so as to be oriented towards each other across said longitudinal axis.

22. The improvement defined in claim 19, claim 20 or claim 21 wherein at least one of the horn assemblies is disposed so as to be oriented in a direction substantially orthogonal to said plane.

23. The improvement defined in claim 22 wherein at least two such horn assemblies are disposed and arranged substantially parallel with one another.

24. The improvement defined in claim 22 wherein at least one of said horn assemblies is disposed so as to be oriented obliquely to said plane.

25. The improvement defined in claim 18 wherein at least one of said horn assemblies is disposed so as to be oriented substantially orthogonally to a plane orthogonal to a longitudinal axis of said tool assembly.

26. The improvement defined in claim 25 wherein at least two such horn assemblies are disposed and arranged substantially in parallel with one another.

27. The improvement defined in claim 18 or claim 26 wherein at least one of said horn assemblies is disposed so as to be oriented obliquely with an angle to said plane.

28. The improvement defined in claim 18 wherein said portion of the tool assembly is said electrode support member.

29. The improvement defined in claim 28 wherein said electrode support member is in the form of a circular disk coaxial with said spindle.

30. The improvement defined in claim 28 or claim 29 wherein more than one machining electrodes are securely supported by said electrode support member and spacedly arranged thereon to extend substantially in parallel with one another.

31. The improvement defined in claim 18 wherein said power supply means is adapted to intermittently energize at least one of said electromechanical transducers to provide from the vibration output face of said horn member a succession of time-spaced bursts of mechanical vibrations of an adjusted intensity and to permit said time-spaced bursts of mechanical vibration to be transmitted through said at least one electrode to the machining surface thereof.

32. The improvement defined in claim 31 wherein said power supply means is provided with means for energizing each of said electromechanical transducers simultaneously at least for a time period.

33. The improvement defined in claim 31 wherein said power supply means is provided with means for energizing said electromechanical transducers sequentially.

34. The improvement defined in claim 32 or claim 33 wherein said power supply means is adapted to periodically energize and deenergize each of said electromechanical transducers with predetermined times of energization and deenergization.

* * * * *